O. JOHNSON.
COUPLING FOR VEHICLES.
APPLICATION FILED JUNE 29, 1911.
1,065,688.
Patented June 24, 1913.
2 SHEETS—SHEET 1.
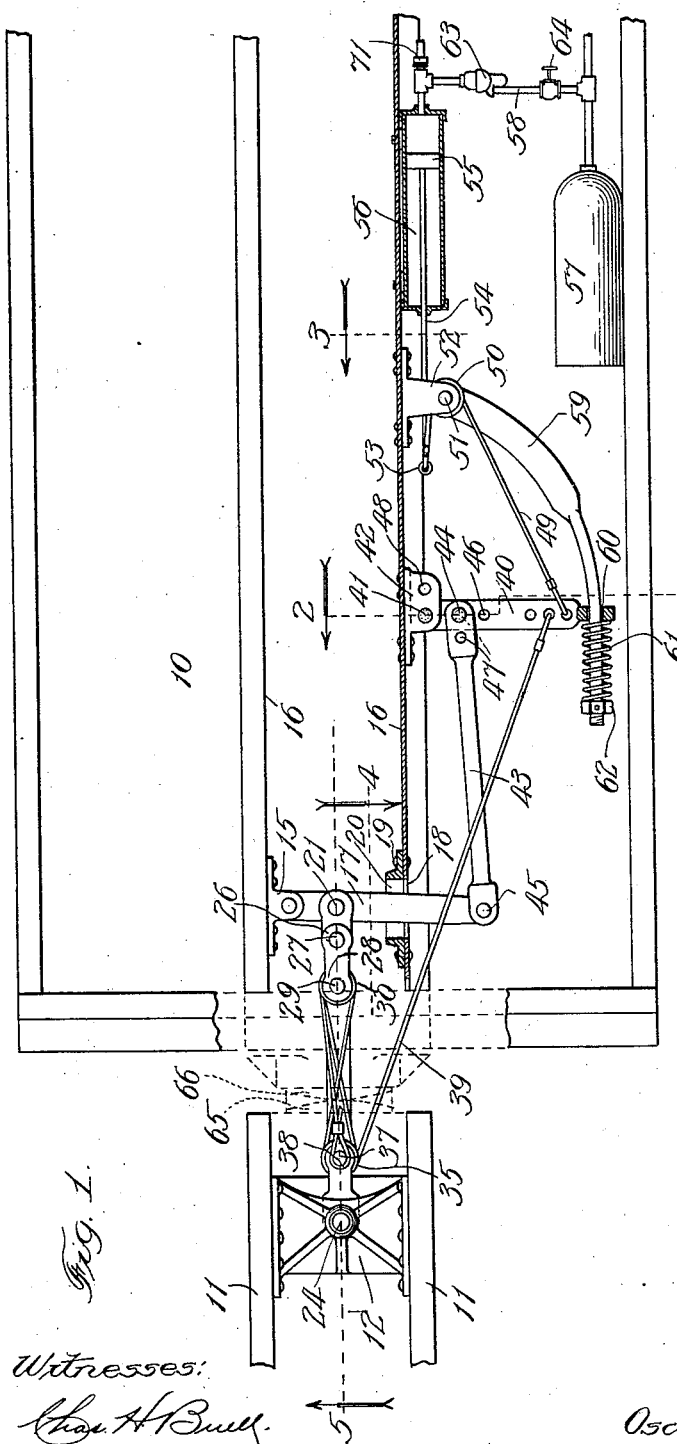
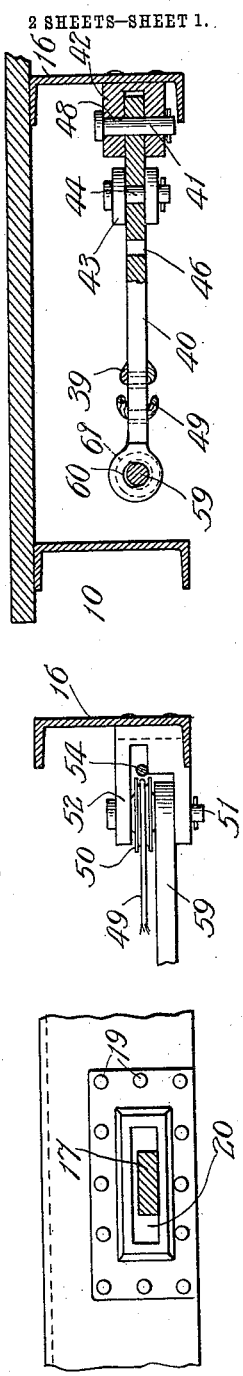

O. JOHNSON.
COUPLING FOR VEHICLES.
APPLICATION FILED JUNE 29, 1911.
1,065,688.
Patented June 24, 1913.
2 SHEETS—SHEET 2.
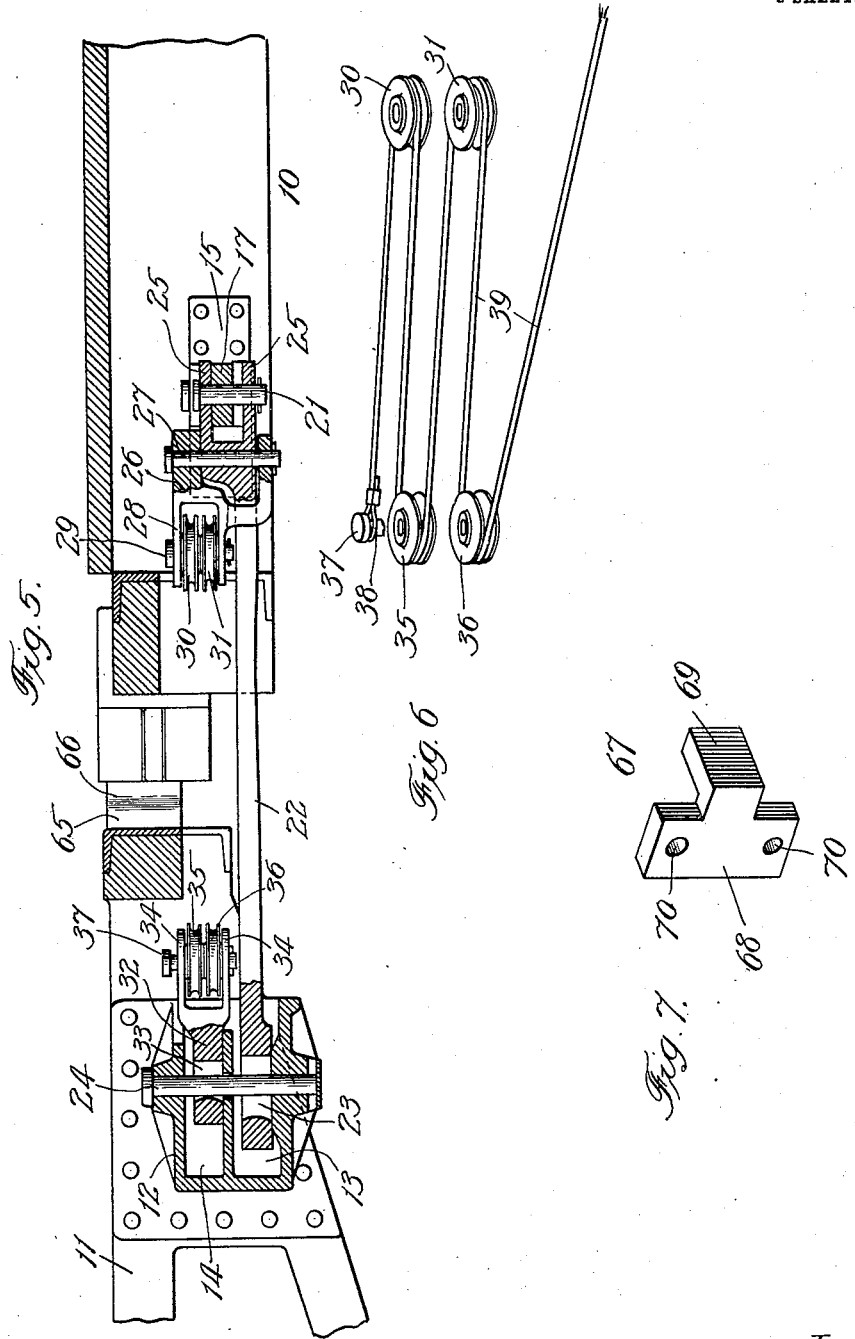

UNITED STATES PATENT OFFICE.

OSCAR JOHNSON, OF CHICAGO, ILLINOIS.

COUPLING FOR VEHICLES.

1,065,688.  Specification of Letters Patent.  Patented June 24, 1913.

Application filed June 29, 1911. Serial No. 635,965.

*To all whom it may concern:*

Be it known that I, OSCAR JOHNSON, a citizen of the United States, residing at Chicago, in the county of Cook and State of Illinois, have invented a new and useful Improvement in Couplers for Vehicles, of which the following is a specification.

My invention relates more particularly to coupling means used as the connecting medium for vehicles where one is to be pulled by the other, as for example in the case of locomotives and tenders for use in connection with which I have especially devised my invention, though it may be utilized in connection with other vehicles where uncoupling thereof is not frequent.

In the use of coupling-mechanism wear results especially at the pin-receiving openings therein, producing slack between the vehicles which is objectionable as it produces the pounding of the coöperating chafing plates or bumpers against each other, and jerking of the vehicle being pulled. Various constructions have been provided with the idea of compensating for the wear of the pin-openings in the coupling-means and taking up the slack thus produced, but the constructions as hitherto provided present certain disadvantages which it is my desire and object to overcome.

Generally stated, my object is to provide a novel, simple and positively-operating construction of coupling-mechanism by which wear thereof may be compensated for and the slack in the mechanism produced by such wear taken up.

Another object is to provide improved means which shall operate automatically to take up the slack and hold the chafing plates, or bumpers, of the coupled vehicles together at all times.

Referring to the accompanying drawings—Figure 1 is a broken plan view of the under structure of a tender and the rear end of a locomotive coupled together by coupling-mechanism constructed in accordance with my invention, the coupling-mechanism being shown in plan. Fig. 2 is an enlarged section taken at the line 2 on Fig. 1 and viewed in the direction of the arrow. Fig. 3 is a similar view taken at the line 3 on Fig. 1 and viewed in the direction of the arrow. Fig. 4 is an enlarged section taken at the line 4 on Fig. 1 and viewed in the direction of the arrow. Fig. 5 is an enlarged broken section taken at the line 5 on Fig. 1 and viewed in the direction of the arrow. Fig. 6 is a perspective view of the pulley-mechanism forming a part of the coupling-mechanism illustrated in Fig. 1, the pulleys in this figure being shown in disassembled but related condition; and Fig. 7, a perspective view of a filler-member used in connection with the coupling-mechanism of the preceding figures.

I have illustrated my improved coupling-mechanism as the coupling medium of a locomotive and a tender, as I have devised it, more particularly, for use in this connection, the tender being represented at 10 and the rear ends of the longitudinal channel girders of the locomotive, as usually constructed, at 11. Secured between the girders 11 is a coupler-head 12 which presents, as is usual in locomotive constructions, draft-bar receiving sockets 13 and 14. The tender 10 is equipped with a bearing-head 15 secured to a side of one of two central girders 16 thereof, and pivoted on the head 15 is a lever 17 which extends at its free end through an opening 18 in the other of the girders 16, the opening 18 being flanked by a block 19 containing an aperture which alines with the opening 18, the block 19 being secured to this girder.

Pivoted at its rear end to the lever 17, intermediate the central girders 16, as indicated at 21, is a draft-bar 22, the forward end of which extends into the socket 13, this bar containing an elongated opening 23 through which a coupling pin 24 carried by the head 12 extends. The rear end of the bar 22, which is of yoke-shape as indicated at 25, and straddles the lever 17, carries a yoke-member 26 which extends both above and below the bar 22 and is pivoted to the latter as by a pin 27, the front end of the member 26 being provided with a yoke-extension 28 which carries a pin 29 on which horizontally-disposed pulleys 30 and 31 are journaled.

Located in the upper socket 14 is a member 32 containing in its inner end an elongated slot 33 through which the coupling pin 24 extends, and formed at its outer end with a yoke 34 between the arms of which horizontally-disposed pulleys 35 and 36 are journaled on a pin 37 carried by this yoke. Fastened to the upper end of the pin 37, as indicated at 38, is one end of a cable 39 which passes back and forth around the pulleys 30, 35, 31 and 36 as represented in Fig. 6, the free end of the cable 39 extending rearwardly and connecting with the outer end of a lever 40 fulcrumed on a removable pin 41 carried by a yoke-member 42 secured to the outer face of the girder 16 carrying the block 19, the lever 40 being connected with the lever 17 through the medium of a link 43 which is pivoted to these levers as represented at 44 and 45, respectively, the levers 40 and 43 and member 42 being provided with a plurality of openings 46, 47 and 48 for permitting these members to be adjustably connected together for a purpose hereinafter stated.

The lever 40 is connected at its outer end with a cable 49 which runs over a pulley 50 journaled on a shaft 51 in a bracket 52 secured to the girder 16 carrying the member 42, and connects, as indicated at 53, with the forward end of a piston-rod 54 carried by a piston-head 55 movable in a cylinder 56 secured to the girder 16 last referred to, this cylinder connecting at its rear end with a suitable fluid-pressure supply, as for instance the main compressed-air tank 57 usually provided on the tender, as through the medium of pressure-reducing valve-equipped pipes 58. Pivoted to the member 52 on the pin 51 is an arc-shaped arm 59 which projects forwardly and loosely extends, at its outer end, through an opening 60 in the extreme outer end of the lever 40, a spring 61 surrounding the end of the arm 59 and being confined thereon between the lever 40 and a nut 62 adjustable on the projecting end of this arm. In the arrangement illustrated, the rear face of the piston 55 is subjected to a uniform pressure of air from the tank 57, the air-pressure being regulated through the medium of a pressure-reducing valve 63 and a manually-controlled valve 64 in the pipe 58, and the spring 61 is so tensioned by adjusting the nut 62 that the combined forces exerted on the lever 40 by the cable 49 and this spring operate, through the medium of the lever 40, to draw the pulley-equipped members 26 and 32 toward each other with a force slightly in excess of the maximum pull exerted by the locomotive when traveling on a straight track, thereby holding the chafing-plates 65 and 66 on the locomotive and tender, respectively, in abutting condition. The draw-bar 22 in the arrangement illustrated is held at its forward end out of engagement with the coupling pin 24 as illustrated in Fig. 5. The abutting surfaces of the chafing plates 65 and 66 are usually of arc-shape as represented in Fig. 1, the arcs described thereby being of such radius that when the locomotive and tender move over a curved track the distance between the coupling-pin centers is not increased, but these chafing-plates soon become worn in use to a degree which causes a leverage to be exerted by them when the locomotive and tender are running over a curved track and the distance between coupling-pin centers thus increases. As the force tending to draw the members 26 and 32 toward each other, as stated, is but slightly in excess of the maximum pull exerted by the locomotive when traveling on a straight track, when the locomotive and tender move over a curved track the leverage exerted by the chafing-plates 65 and 66 overcomes this force and swings the levers 17 and 40 to the left in Fig. 1 against the tension of the spring 61 and the fluid-pressure in the cylinder 56, the levers 17 and 40 resuming their normal position when the locomotive and tender are again brought to alining condition. It will thus be understood that the chafing-plates 65 and 66, which preferably are non-yieldingly secured to the locomotive and tender, are held at all times in abutting condition, and sufficient give is afforded in the rigging when the locomotive and tender are moving on a curve to prevent impairment of the rigging.

In the particular arrangement illustrated, the draft-bar 22 is designed as a safety-device in the event of the breaking of the cable-rigging described. Should the latter break or otherwise become impaired, the draft-bar 22 will automatically be brought into action and serve as the coupling medium for the locomotive and tender through the medium of the pins 21 and 24. In this event, the apparatus illustrated may be adjusted, for automatically taking up the slack in the mechanism, by adjusting the pivotal connections between the link 43 and the lever 40 and the latter and the block 42, to a position in which the chafing plates 65 and 66 abut, and the lever 17 extends out of contact with the front walls of the openings in the girder 16 and the block 19, and the pressure in the cylinder 56 and the tension of the spring 61 regulated, to cause the forces exerted against the lever 17 and tending to swing it to the right in Fig. 1, to be slightly greater than the maximum pull of the locomotive when traveling on a straight track, so that the chafing-plates 65 and 66 will be held together at all times, and when the locomotive and tender are rounding a curve the lever 40 will yield sufficiently to prevent undue leverage on the rigging.

In the event of excessive wear of the pin-openings in the coupling devices, thus producing excessive lengthening of the coupling-pin centers, it is desirable that such wear be taken up through the medium of the lever 17, and this may be accomplished by inserting a filler-block, such as that represented at 67, into the openings 18 and 20 against the forward walls thereof and forward of the lever 17, this block being adapted to fit at its base 68 against the outer face of the girder carrying the block 19, and at its angle-extension 69 into the openings referred to, bolt or rivet openings 70 in this filler-block adapting it to be secured to this girder.

It will be understood that in so far as the draft pulley mechanism of the construction illustrated is concerned, it is not limited to use in connection with the draft-bar rigging shown, as it could, if desired, be used to advantage with any other type of draft-bar, or, if desired, independent of any draft-bar, as will be manifest to those skilled in the art. It will also be understood that the stiff draft-bar mechanism, which in the particular construction illustrated is provided as a safety feature, may be used alone, if desired. Furthermore, while I have shown and described both fluid-pressure and spring means for automatically taking up the slack in the mechanism, a combination of these means being desirable when extra large or a plurality of locomotives are used, I do not wish to be understood as intending to limit my invention to the use of such combination of means for this purpose, as either the fluid-pressure or the spring-tensioning means may be used alone, or any other suitable means for accomplishing this purpose may be employed, as will be manifest to those skilled in the art, the idea being to hold the chafing plates 65 and 66 together at all times and allow for any leverage exerted by these plates when the locomotive and tender are rounding a curve.

As a means for preventing the production of back-pressure in the cylinder 56, substantially in excess of the pressure in the tank 57 when the piston 55 is forced against the air-pressure in the cylinder by the movement of the coupling-mechanism under the action of the chafing-plates when the vehicles are rounding a curve, I provide a safety-valve 71 of any suitable construction on the rear end of the cylinder 56 so regulated that it will permit the air-pressure in the cylinder to escape when it exceeds the pressure in the tank 57.

It will be understood that while I have shown the lever 17 connected up with the lever 40 during the operation of the pulley and cable means, such arrangement of parts is not essential to the proper operation of these pulley and cable means, as the link 43 may be omitted if desired, in which case the lever 17 would bear against the stop provided by the forward wall of the opening 18 in the girder 16.

What I claim as new, and desire to secure by Letters Patent, is—

1. The combination with vehicles arranged one in advance of the other, of coupling-means formed of a draft-bar operatively connected at its opposite ends with said vehicles and having a loose connection with one of the latter, pulley-equipped members one of which is connected with one of said vehicles and the other of which is connected with said draft-bar, cable-means extending about the pulleys on said members and means for yieldingly pulling on said cable to draw said members toward each other and hold the chafing-plates of said vehicles in abutting condition, for the purpose set forth.

2. The combination with vehicles arranged one in advance of the other, of coupling-means formed of a lever fulcrumed on one of said vehicles, a draft-bar connected at one end with said lever and at its opposite end with the other of said vehicles, pulley-equipped spaced members one of which is connected with said draft-bar and the other of which is connected with one of said vehicles, cable-means connecting said members together, means operatively connected with the said cable for drawing on the latter to move said pulley-equipped members toward each other and hold the chafing-plates on the vehicles in abutting condition and means for operatively connecting said lever with said first-named means, for the purpose set forth.

3. The combination with vehicles arranged one in advance of the other, of coupling-means formed of coupling members, and means operatively engaging with said coupling members for yieldingly holding the chafing plates of said vehicles in abutting condition comprising a cylinder adapted to be connected with a source of fluid-pressure, a piston in said cylinder, a cable operatively connected at one end with said coupling members and at its opposite end with said piston, and a pulley over which said cable extends operating to cause said cable to pull in the direction opposite to that in which the piston moves, for the purpose set forth.

4. The combination of vehicles arranged one in advance of the other, of chafing-plates on the respective vehicles, and means for holding the chafing-plates in contact comprising a yieldingly-supported lever on one of said vehicles, an attaching-support on the other of said vehicles, a coupler connecting said support and lever, piston and cylinder mechanism connected with the vehicle on which said lever is supported, and means connected with said piston and cylinder mechanism and with said lever for yieldingly pulling on the latter to draw said chafing-plates together and hold them in abutting condition, said lever and piston and cylinder mechanism being connected with the vehicle on which they are supported at opposite sides of the central line of said vehicle and at substantially the same distance from said central line.

5. The combination with vehicles arranged one in advance of the other, of coupling-means formed of members operatively connected, respectively, with said vehicles, cable-means extending from one of said members to the other thereof and connecting said members together, a lever fulcrumed on one of said vehicles and operatively connected with said cable, piston-and-cylinder mechanism on one of said vehicles operatively connected with said lever for pulling on said cable for drawing said members toward each other for holding the chafing-plates of the vehicles in abutting condition, and spring-means operatively engaging with said lever for supplementing the action of said piston-and-cylinder mechanism.

OSCAR JOHNSON.

In presence of—
A. U. THORIEU,
R. A. SCHAEFER.

---

Copies of this patent may be obtained for five cents each, by addressing the "Commissioner of Patents, Washington, D. C."